(12) United States Patent
Lee et al.

(10) Patent No.: US 10,457,115 B2
(45) Date of Patent: Oct. 29, 2019

(54) AIR CONDITIONING SYSTEM FOR VEHICLE

(71) Applicant: HANON SYSTEMS, Daejeon (KR)

(72) Inventors: Sung Je Lee, Daejeon (KR); Yun Jin Kim, Daejeon (KR); Jae Chun Ryu, Daejeon (KR); Tae Yong Park, Daejeon (KR); Se Min Lee, Daejeon (KR); Yong Nam Ahn, Daejeon (KR); Dae Bok Keon, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 151 days.

(21) Appl. No.: 15/226,963

(22) Filed: Aug. 3, 2016

(65) Prior Publication Data
US 2017/0043646 A1 Feb. 16, 2017

(30) Foreign Application Priority Data

Aug. 10, 2015 (KR) .......................... 10-2015-0112374
Jul. 15, 2016 (KR) .......................... 10-2016-0089682

(51) Int. Cl.
*B60H 1/00* (2006.01)
*B60H 1/32* (2006.01)
*B60H 3/06* (2006.01)

(52) U.S. Cl.
CPC ....... *B60H 1/00842* (2013.01); *B60H 1/0005* (2013.01); *B60H 1/00057* (2013.01);
(Continued)

(58) Field of Classification Search
CPC ............ B60H 1/00842; B60H 1/00835; B60H 1/00849; B60H 1/0005; B60H 1/00057; B60H 1/00471; B60H 1/3229; B60H 3/0641; B60H 2001/00099; B60H 2001/00135; B60H 2001/00178;
(Continued)

(56) References Cited

U.S. PATENT DOCUMENTS

2006/0196205 A1* 9/2006 Richter ................ B60H 1/0005
62/239
2006/0285967 A1* 12/2006 Wang ................. B60H 1/00471
415/98

(Continued)

FOREIGN PATENT DOCUMENTS

DE           4034290 A1    5/1992
DE       102013110965 A1    4/2015
(Continued)

*Primary Examiner* — Joseph F Trpisovsky
(74) *Attorney, Agent, or Firm* — Dickinson Wright PLLC

(57) ABSTRACT

Disclosed is an air conditioning system for a vehicle which includes a cold air passageway having a heat exchanger for cooling and a warm air passageway having a heat exchanger for heating inside an air-conditioning case to carry out cooling and heating and which controls to inhale indoor air inside the vehicle, pass the air through the heat exchanger for cooling and discharge the air outside the vehicle in a specific mode, thereby preventing frosting of the heat exchanger for cooling because supplying air of high temperature dehumidified inside the interior of the vehicle to the heat exchanger for cooling, and enhancing heating performance by rising refrigerant pressure and temperature in the refrigerant cycle without needing additional components.

17 Claims, 10 Drawing Sheets

(52) U.S. Cl.
CPC ....... *B60H 1/00471* (2013.01); *B60H 1/3229* (2013.01); *B60H 3/0641* (2013.01); *B60H 2001/00099* (2013.01); *B60H 2001/00135* (2013.01); *B60H 2001/00178* (2013.01); *B60H 2001/00607* (2013.01)

(58) Field of Classification Search
CPC ............ B60H 1/00664; B60H 1/00028; B60H 1/88849; B60H 2001/00085; B60H 2001/00092; B60H 2001/00721
USPC .......................................................... 62/409
See application file for complete search history.

(56) References Cited

U.S. PATENT DOCUMENTS

| | | | | |
|---|---|---|---|---|
| 2009/0205354 A1* | 8/2009 | Brown | ................... | F24F 3/1405 |
| | | | | 62/324.5 |
| 2011/0165830 A1* | 7/2011 | Smith | ................ | B60H 1/00278 |
| | | | | 454/75 |
| 2014/0075974 A1* | 3/2014 | Klein | ................... | B60H 1/3202 |
| | | | | 62/119 |
| 2014/0216705 A1 | 8/2014 | Dage et al. | | |
| 2015/0082820 A1* | 3/2015 | Takahashi | ............ | B60H 1/0005 |
| | | | | 62/238.7 |
| 2016/0229266 A1* | 8/2016 | Maeda | ................. | B60H 1/0005 |

FOREIGN PATENT DOCUMENTS

| | | | | |
|---|---|---|---|---|
| EP | 0913283 A1 | 5/1999 | | |
| EP | 2716478 A1 | 4/2014 | | |
| EP | 3081409 A1 | 10/2016 | | |
| JP | 2004224285 A | 8/2004 | | |
| JP | 2009113560 A | 5/2009 | | |
| JP | 2012160735 A1 * | 11/2012 | ........... | B60H 1/0005 |
| JP | 2013141932 A | 7/2013 | | |
| JP | 2015128916 A | 7/2015 | | |
| WO | WO2013105200 A1 | 7/2013 | | |

* cited by examiner

Prior art

Prior art

Prior art ated state so
AIR CONDITIONING SYSTEM FOR VEHICLE

CROSS-RELATED APPLICATIONS

This application claims the benefit and priority of Korean Application No. KR 10-2015-0112374 filed Aug. 10, 2015 and Korean Application No. KR 10-2016-0089682 filed Jul. 15, 2016. The entire disclosure of each of the above applications is incorporated herein by reference.

BACKGROUND OF THE INVENTION

Field of the Invention

The present invention relates to an air conditioning system for a vehicle, and more particularly, to an air conditioning system for a vehicle which includes a cold air passageway having a heat exchanger for cooling and a warm air passageway having a heat exchanger for heating inside an air-conditioning case to carry out cooling and heating and which controls to inhale indoor air inside the vehicle, pass the air through the heat exchanger for cooling and discharge the air outside the vehicle in a specific mode.

Background Art

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses gas-phase refrigerant of low-temperature and low-pressure while driving by driving power of an engine or a motor, and then sends the refrigerant in the gaseous phase of high-temperature and high-pressure to the condenser 2. Then, the condenser 2 condenses the gas-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the gas-phase refrigerant is inhaled into the compressor 1, and then, recirculates the refrigeration cycle as described above.

The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Moreover, the interior of the vehicle is heated by a heater core (not shown) which is mounted inside the air-conditioning case and through which coolant of the engine circulates or by an electric heater (not shown) mounted inside the air-conditioning case.

In the meantime, the condenser 2 is mounted at the front side of the vehicle to radiate heat while exchanging heat with air.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside one air-conditioning case 10; an evaporator 4 mounted on the cold air passageway 11 for cooling; and a condenser 2 mounted on the warm air passageway 12 for heating.

In this instance, an air outflow port 15 is formed at an outlet of the air-conditioning case 10 for supplying air to the interior of the vehicle, and an air discharge port 16 is also formed at the exist of the air-conditioning case 10 for discharging air to the exterior of the vehicle.

Furthermore, blowers 20 which are operated individually are respectively mounted at an inlet of the cold air passageway 11 and at an inlet of the warm air passageway 12.

Because the cold air passageway 11 and the warm air passageway 12 are arranged at the right and the left, namely, in the width direction of the vehicle, the two blowers 20 are also arranged at the right and the left.

Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

Additionally, as shown in FIG. 3, an extractor 50 is generally mounted on a trunk of the vehicle in order to discharge the indoor air of the vehicle to the exterior of the vehicle. The extractor 50 is opened by differential pressure between the inside and the exterior of the vehicle.

Therefore, when cold air or warm air is supplied to the interior of the vehicle through the air-conditioning case 10, a predetermined amount of the air (indoor air) circulating inside the vehicle is discharged to the exterior of the vehicle through the extractor 50.

For instance, in a heating mode, warm air is induced to the interior of the vehicle. In this instance, due to VOC and moisture on a window, a predetermined amount of the air (indoor air) of the vehicle is discharged to the exterior of the vehicle through the extractor 50.

However, a conventional air conditioning system cannot utilize the indoor air (heated air) discharged to the exterior of the vehicle through the extractor 50. Furthermore, in order to enhance heating performance, the conventional air conditioning system further includes a chiller (not shown) which is mounted on the cooling cycle of the air conditioning system and exchanges heat between refrigerant and coolant heated by waste heat of electronic units of the vehicle so as to enhance heating performance by increasing refrigerant pressure and temperature. In this instance, the conventional air conditioning system needs additional components, such as the chiller, in order to enhance heating performance.

In addition, the conventional air conditioning system has further disadvantages in that frosting is generated on the evaporator and it deteriorates heating performance under high humid conditions.

SUMMARY OF THE INVENTION

Accordingly, the present invention has been made in view of the above-mentioned problems occurring in the prior art, and it is an object of the present invention to provide an air conditioning system for a vehicle which includes a cold air passageway having a heat exchanger for cooling and a warm air passageway having a heat exchanger for heating inside an air-conditioning case to carry out cooling and heating and which controls to inhale indoor air inside the vehicle, pass the air through the heat exchanger for cooling and discharge the air outside the vehicle in a specific mode, thereby preventing frosting of the heat exchanger for cooling because supplying air of high temperature dehumidified inside the interior of the vehicle to the heat exchanger for cooling, and enhancing heating performance by rising refrigerant pressure and temperature in the refrigerant cycle without needing additional components.

To accomplish the above object, according to the present invention, there is provided an air conditioning system for a vehicle including: an air-conditioning case having a cold air passageway having a heat exchanger for cooling and a warm air passageway having a heat exchanger for heating; an air blower which is mounted at an inlet of the air-conditioning case to blow air to the cold air passageway and the warm air passageway; indoor and outdoor air supplying means which is connected and mounted to the air blower to supply indoor air and outdoor air; and a control unit which controls the indoor and outdoor air supplying means to inhale the indoor air of the vehicle, pass the indoor air through the heat exchanger for cooling and discharge some or the whole of the indoor air to the exterior of the vehicle in a specific mode.

As described above, the air conditioning system for the vehicle according to the present invention which includes a cold air passageway having a heat exchanger for cooling and a warm air passageway having a heat exchanger for heating inside an air-conditioning case to carry out cooling and heating can control to inhale indoor air inside the vehicle, pass the air through the heat exchanger for cooling and discharge the air outside the vehicle in a specific mode, for instance, the heating mode and the dehumidification mode, thereby preventing frosting of the heat exchanger for cooling because supplying air of high temperature dehumidified inside the interior of the vehicle to the heat exchanger for cooling.

Additionally, the air conditioning system for the vehicle according to the present invention recirculates a predetermined amount of indoor air, which will be discharged to the exterior of the vehicle, to the heat exchanger for cooling to release after passing through the heat exchanger for cooling, thereby enhancing heating performance by rising refrigerant pressure and temperature in the refrigerant cycle without needing additional components.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
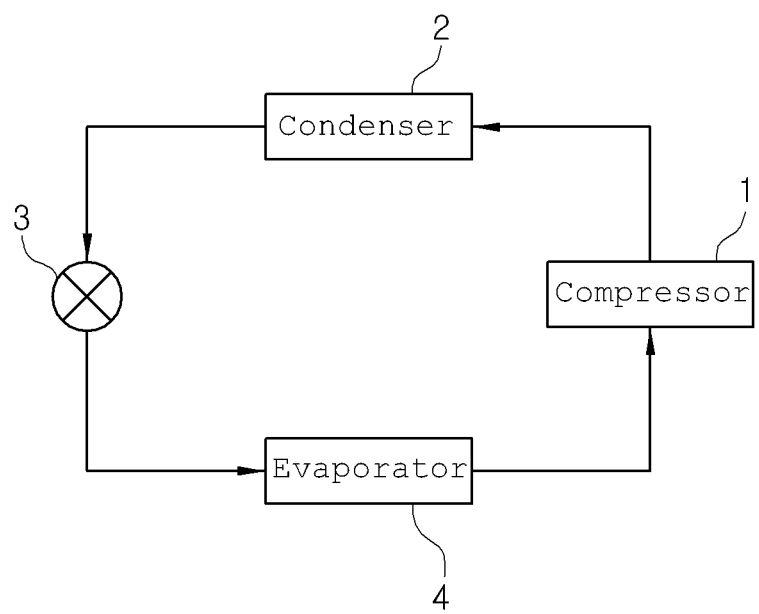
FIG. 1 is a configurative diagram showing a refrigeration cycle of a general air conditioning system for a vehicle.
Figure 2:
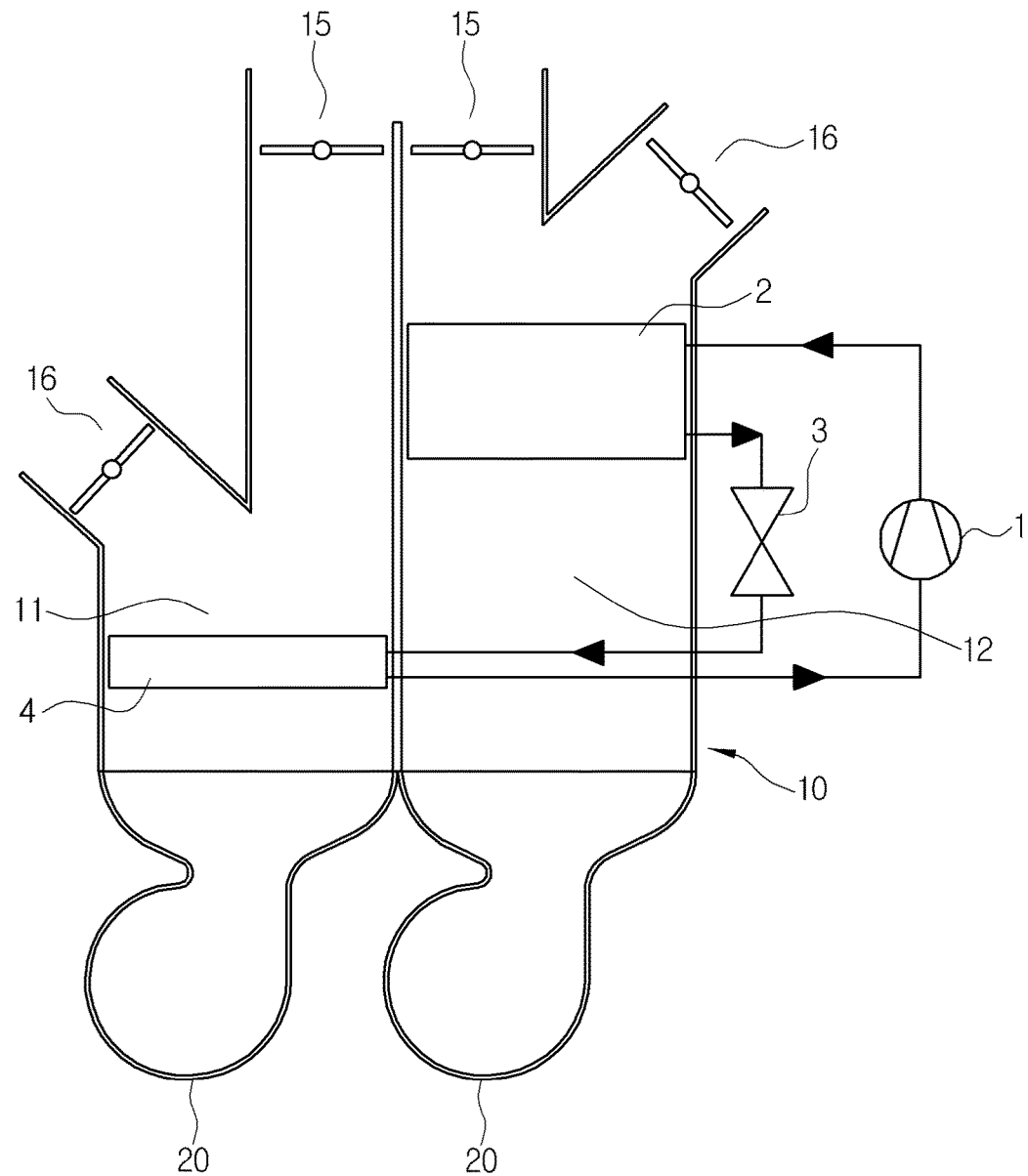
FIG. 2 is a view showing a conventional air conditioning system for a vehicle.
Figure 3:
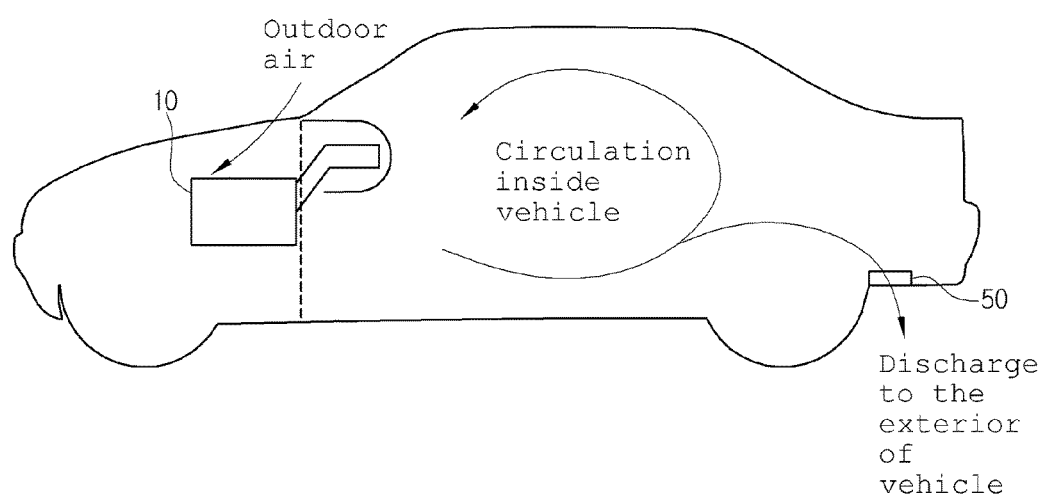
FIG. 3 is a view showing an air flow in a heating mode of the conventional air conditioning system.
Figure 4:
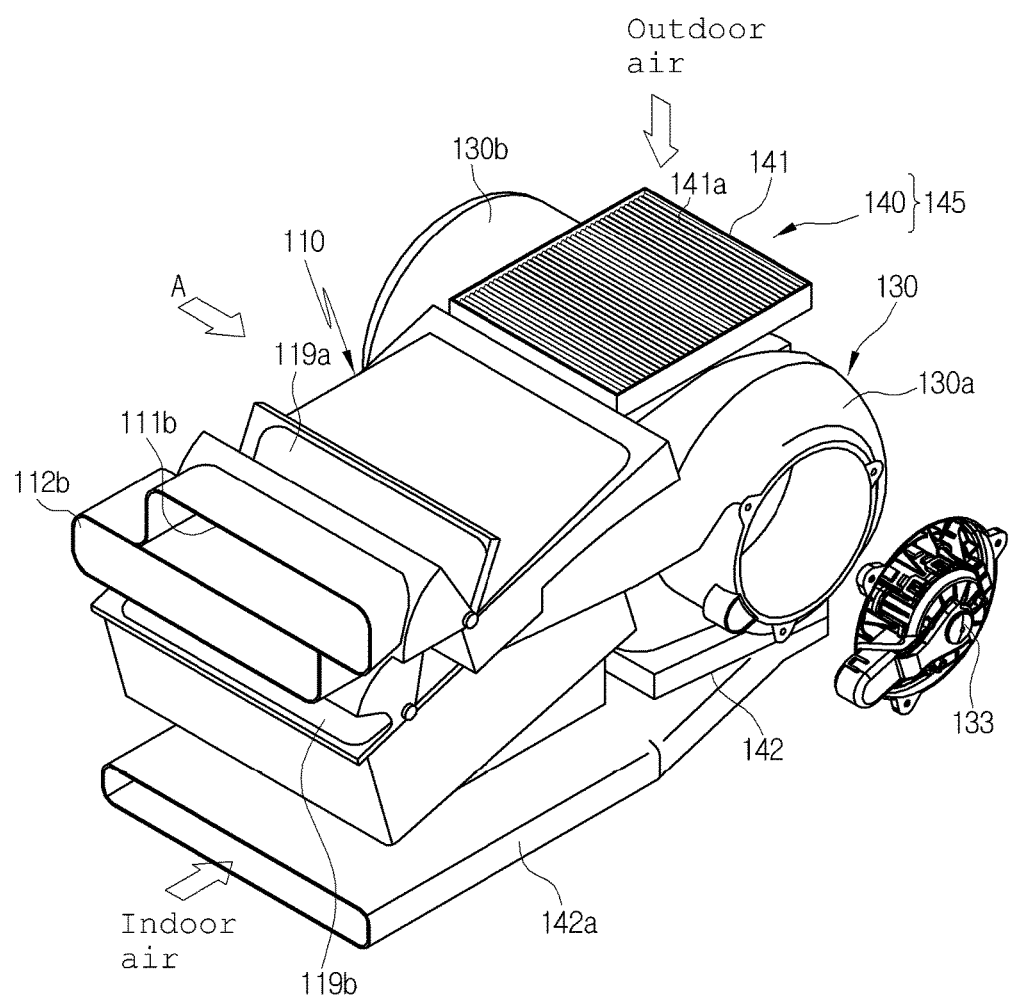
FIG. 4 is a perspective view showing an air conditioning system for a vehicle according to a preferred embodiment of the present invention.

Reference will be now made in detail to the preferred embodiment of the present invention with reference to the attached drawings.

As shown in the drawings, a heat exchanger for cooling and a heat exchanger for heating of an air conditioning system for a vehicle according to the present invention are connected with a compressor and expansion means through a refrigerant circulation line. That is, the air conditioning system for the vehicle according to the present invention includes a compressor (not shown), a heat exchanger for heating, expansion means (not shown) and a heat exchanger for cooling which are connected with one another in order through the refrigerant circulation line (not shown) so as to carry out cooling through the heat exchanger for cooling and carry out heating through the heat exchanger for heating.

In this instance, preferably, the heat exchanger for cooling is an evaporator 104 and the heat exchanger for heating is a condenser 102. Alternatively, the heat exchanger for heating may be a heat exchanger which carries out heating using coolant, namely, a heater core (not shown).

Hereinafter, for convenience, the air conditioning system that adopts the evaporator 104 as the heat exchanger for cooling and the condenser 102 as the heat exchanger for heating will be described.

First, the compressor 100 inhales and compresses gas-phase refrigerant of low-temperature and low-pressure discharged from the evaporator 104 while operating by receiving a driving force from a power supply, such as an engine or a motor, and then, discharges the refrigerant in a gas phase of high-temperature and high-pressure.

The condenser 102 exchanges heat between the gas-phase refrigerant of high-temperature and high-pressure, which is discharged from the compressor 100 and flows inside the condenser 102, and air passing through the condenser 102, and in this instance, the refrigerant is condensed and the air is heated to be changed into warm air.

Such a condenser 102 may have a structure that the refrigerant circulation line or refrigerant pipe (P) is arranged in the form of a zigzag and a radiation fin (not shown) is mounted or a structure that a plurality of tubes (not shown) are stacked up and a radiation fin is mounted between the tubes.

Therefore, the gas-phase refrigerant of high-temperature and high-pressure discharged from the compressor 100 exchanges heat with the air to be condensed while flowing along the zigzag-shaped refrigerant circulation line or the tubes, and in this instance, the air passing through the condenser 102 is heated to be changed into warm air.

Moreover, the expansion means (not shown) rapidly expands liquid-phase refrigerant, which flows after being discharged from the condenser 102, by throttling effect and sends the expanded refrigerant in a saturated state of low-temperature and low-pressure to the evaporator 104.

The expansion means may be an expansion valve or an orifice structure.

The evaporator 104 evaporates the liquid-phase refrigerant of low-pressure, which flows after being discharged from the expansion means, by exchanging heat between the liquid-phase refrigerant and the inside air of the air-conditioning case 110 so as to cool the air due to a heat absorption by an evaporative latent heat of the refrigerant.

Continuously, the gas-phase refrigerant of low-temperature and low-pressure evaporated and discharged from the evaporator 104 is inhaled to the compressor 100 again, and then, recirculates the above-mentioned cycle.

Furthermore, in the above-mentioned refrigerant circulation process, the air blown by a blower unit 130 is induced into the air-conditioning case 110, is cooled by the evaporative latent heat of the liquid-phase refrigerant circulating inside the evaporator 104, and then, is discharged to the interior of the vehicle in a cooled state, so that the interior of the vehicle is heated.

The air blown by the blower unit 130 is induced into the air-conditioning case 110, is heated by heat radiation of the gas-phase refrigerant of high-temperature and high-pressure circulating inside the condenser 102 while passing through the condenser 102, and then, is discharged to the interior of the vehicle in a heated state, so that the interior of the vehicle is cooled.

Additionally, a cold air passageway 111 and a warm air passageway 112 are partitionably formed in a vertical direction by a partition wall 113 which partitions the inside of the air-conditioning case 110 up and down.

That is, the cold air passageway 111 is arranged at an upper part from the partition wall 113, and the warm air passageway 112 is arranged at a lower part from the partition wall 113.

Moreover, the evaporator 104 which is the heat exchanger for cooling is mounted on the cold air passageway 111, and the condenser 102 which is the heat exchanger for heating is mounted on the warm air passageway 112. Furthermore, because the cold air passageway 111 and the warm air passageway 112 are respectively arranged at the upper part and the lower part, the evaporator 104 and the condenser 102 are also respectively arranged at the upper part and the lower part.

In the meantime, besides the condenser 102 using refrigerant, the heat exchanger for heating which is mounted on the warm air passageway 112 may be a heater core using coolant or an electrical heater.

Inside the air-conditioning case 110, cold air flows in the cold air passageway 111 on which the evaporator 104 is mounted and warm air flows in the warm air passageway 112 on which the condenser 102 is mounted, and the cold air passing through the evaporator 104 and the warm air passing through the condenser 102 are supplied to the interior of the vehicle or discharged to the exterior of the vehicle.

Figure 7:
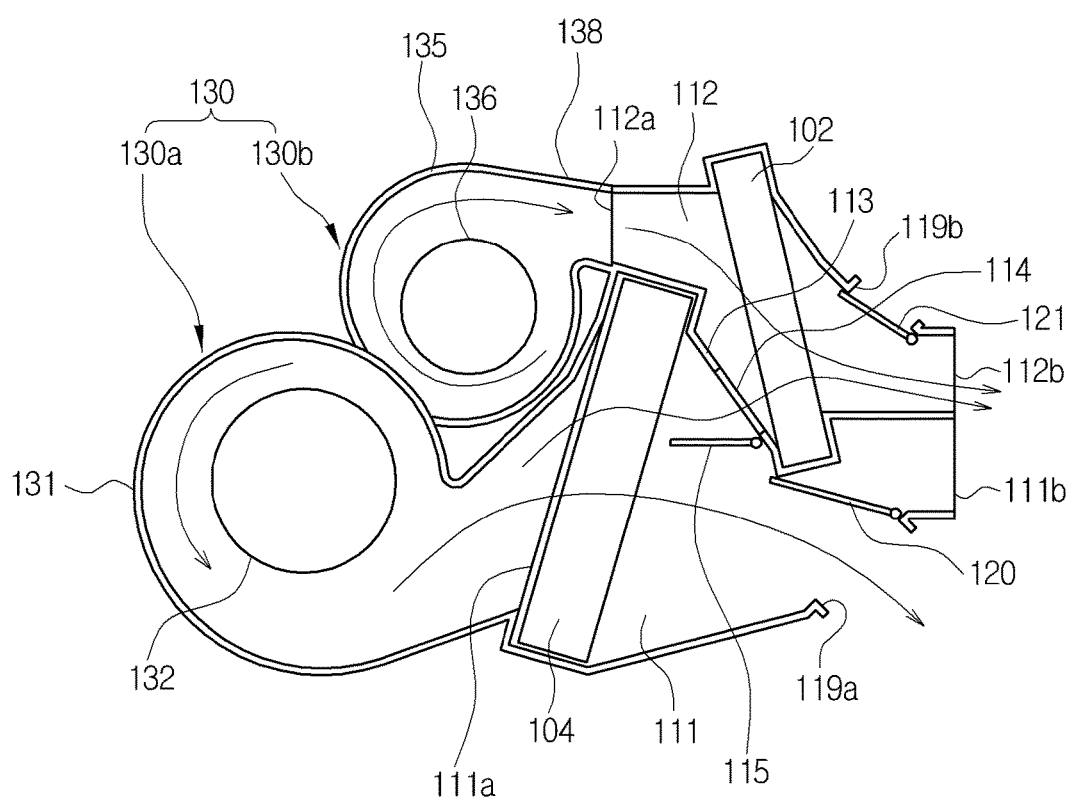
FIG. 7 is a sectional view of an air conditioning system for a vehicle according to another preferred embodiment of the present invention.

The example that the evaporator 104 is mounted at the upper part from the partition wall 113 and the condenser 102 is mounted at the lower part from the partition wall 113 is just described, but on the contrary, as shown in FIG. 7, it is also possible that the evaporator 104 is mounted at the lower part from the partition wall 113 and the condenser 102 is mounted at the upper part from the partition wall 113.

Figure 8:
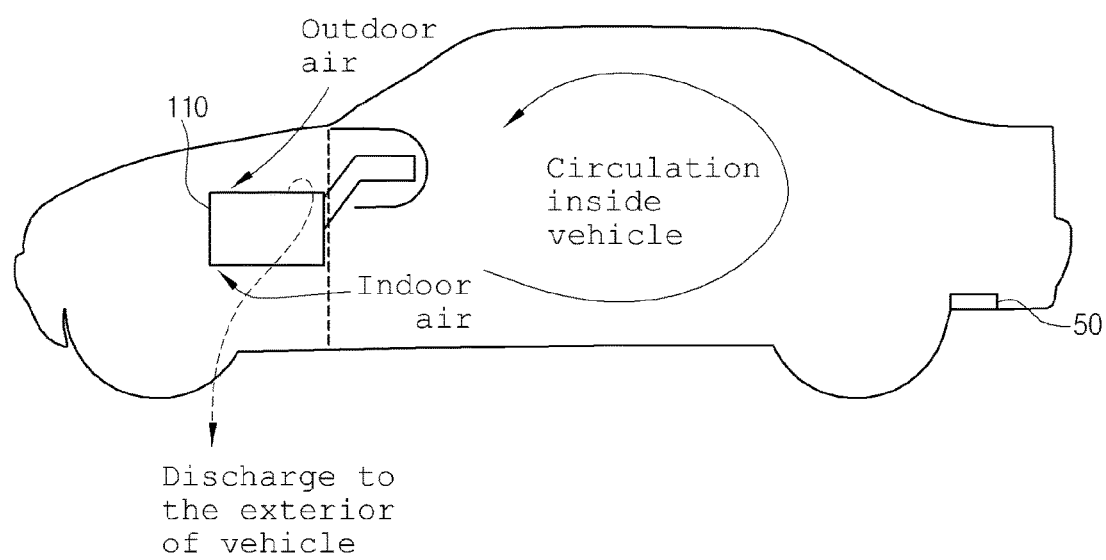
FIG. 8 is a view showing an air flow in a heating mode of the air conditioning system for the vehicle according to the present invention.

Meanwhile, as shown in FIG. 8, the air-conditioning case 110 and the air blower 130 are mounted on the outer surface of a bulkhead which forms a passenger's room inside the vehicle, for instance, may be mounted inside an engine room of the vehicle.

Moreover, the air blower 130 mounted at an inlet side of the air-conditioning case 110 includes: a first blower 130*a* which is connected to an inlet 111*a* of the cold air passageway 111 of the air-conditioning case 110 to blow air to the cold air passageway 111; and a second blower 130*b* which is connected to an inlet 112*a* of the warm air passageway 112 of the air-conditioning case 110 to blow air to the warm air passageway 112.

Figure 5:
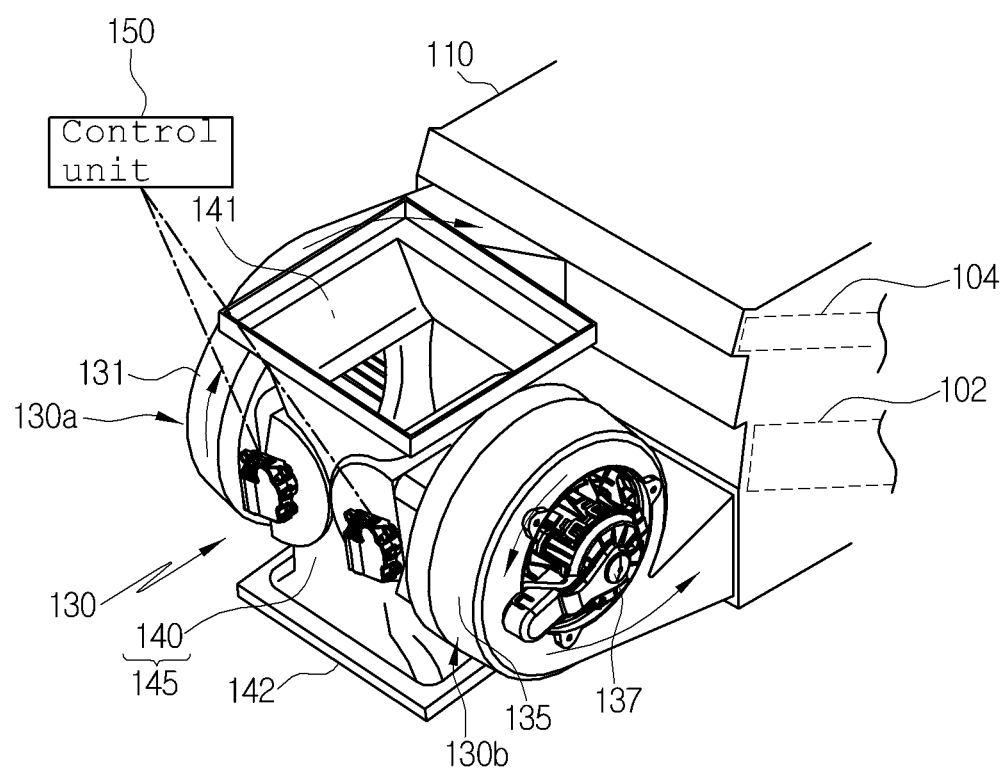
FIG. 5 is a partially perspective view showing an air blower of the air conditioning system for the vehicle according to the present invention.

As shown in FIG. 5, the first blower 130*a* and the second blower 130*b* are mounted to be spaced apart from each other in the width direction of the vehicle. Of course, the first blower 130*a* and the second blower 130*b* may be arranged in various ways in a state that the first blower 130*a* and the second blower 130*b* are respectively connected to the inlet 111*a* of the cold air passageway 111 and the inlet 112*a* of the warm air passageway 112.

The first blower 130*a* includes: a scroll case 131 which is connected to the inlet 111*a* of the cold air passageway 111 of the air-conditioning case 110; a blast fan 132 rotatably mounted inside the scroll case 131; an inlet ring 131*a* which is formed on one side of the scroll case 131 to induce indoor air and outdoor air; and a motor 133 which is mounted on the other side of the scroll case 131 to rotate the blast fan 132.

The inlet ring 131*a* is formed on the one side of the scroll case 131 to which an intake duct 140 of indoor air and outdoor air supplying means 145 is joined.

The second blower 130*b* includes: a scroll case 135 which is connected to the inlet 112*a* of the warm air passageway 112 of the air-conditioning case 110; a blast fan 136 rotatably mounted inside the scroll case 135; an inlet ring 135*a* which is formed on one side of the scroll case 135 to induce indoor air and outdoor air; and a motor 137 which is mounted on the other side of the scroll case 135 to rotate the blast fan 136.

The inlet ring 135*a* is formed on the one side of the scroll case 135 to which an intake duct 140 of indoor air and outdoor air supplying means 145 is joined.

Furthermore, the inlet ring 131*a* of the first blower 130*a* and the inlet ring 135*a* of the second blower 130*b* are formed to face each other.

In the meantime, the scroll cases 131 and 135 of the first and second blowers 130*a* and 130*b* are formed in a scroll form based on the blast fans 132 and 136.

Additionally, the indoor air and outdoor air supplying means 145 for supplying indoor air and outdoor air is mounted and connected to the first and second blowers 130a and 130b.

The indoor air and outdoor air supplying means 145 includes: an intake duct 140 which is connected to be communicated with the first and second blowers 130a and 130b and has an indoor air inlet 142 and an outdoor air inlet 141; a first indoor and outdoor air converting door 147 which selectively opens the outdoor air inlet 141 and the indoor air inlet 142 relative to the first blower 130a; and a second indoor and outdoor air converting door 148 which selectively opens the outdoor air inlet 141 and the indoor air inlet 142 relative to the second blower 130b.

Because one intake duct 140 is mounted between the first blower 130a and the second blower 130b, the first and second blowers 130a and 130b can commonly use the one intake duct 140.

As described above, because the intake duct 140 is mounted between the first blower 130a and the second blower 130b, the system using the two blowers 130a and 130b which are operated individually uses just one intake duct 140 so as to maximize space efficiency and reduce the size and manufacturing costs of the system.

In the meantime, in the drawings, it is illustrated that the indoor air and outdoor air supplying means 145 is arranged between the first blower 130a and the second blower 130b, but it is also possible that the first blower 130a and the second blower 130b are arranged together at one side of the inlet of the air-conditioning case 110 and the indoor air and outdoor air supplying means 145 is arranged at the other side, namely, at one side of the first blower 130a and the second blower 130b.

The intake duct 140 includes: the outdoor air inlet 141 for inducing outdoor air and the indoor air inlet 142 for inducing indoor air, and in this instance, preferably, the outdoor air inlet 141 is formed at the upper part of the intake duct 140 and the indoor air inlet 142 is formed at the lower part of the intake duct 140.

The first indoor and outdoor air converting door 147 and the second indoor and outdoor air converting door 148 are respectively mounted between the indoor air inlet 142 and the outdoor air inlet 141 of the intake duct 140.

The first indoor and outdoor air converting door 147 is a dome-shaped door and is arranged at an inlet side of the first blower 130a in order to selectively open the indoor air inlet 142 and the outdoor air inlet 141 relative to the first blower 130a.

The second indoor and outdoor air converting door 148 is a dome-shaped door and is arranged at an inlet side of the second blower 130b in order to selectively open the indoor air inlet 142 and the outdoor air inlet 141 relative to the second blower 130b.

As described above, because one intake duct 140 is mounted between the first and second blowers 130a and 130b and the first and second indoor and outdoor air converting doors 147 and 148 are mounted inside the intake duct 140, indoor air and outdoor air induced into the indoor air inlet 142 and the outdoor air inlet 141 of the intake duct 140 can be selectively supplied to the evaporator and the condenser through the first and second blowers 130a and 130b.

In the meantime, the outdoor air inlet 141 of the intake duct 140 communicates with the exterior of the vehicle, and the indoor air inlet 142 of the intake duct 140 communicates with the interior of the vehicle.

In this instance, an indoor air inflow duct 142a is mounted on the air-conditioning case 110 to connect the indoor air inlet 142 of the intake duct 140 and the interior of the vehicle with each other.

Furthermore, air filters 141a are respectively mounted on the outdoor air inlet 141 and the indoor air inlet 142 so as to remove impurities contained in the air induced into the outdoor air inlet 141 and the indoor air inlet 142.

Additionally, at an outlet side of the cold air passageway 111 of the air-conditioning case 110, disposed are a cold air outflow port 111b for discharging the cold air passing through the evaporator 104 to the interior of the vehicle, a cold air discharge port 119a for discharging the cold air to the exterior of the vehicle, and a cold air mode door 120 for opening and closing the cold air outflow port 111b and the cold air discharge port 119a.

At an outlet side of the warm air passageway 112 of the air-conditioning case 110, disposed are a warm air outflow port 112b for discharging the warm air passing through the condenser 102 to the interior of the vehicle, a warm air discharge port 119b for discharging the warm air to the exterior of the vehicle, and a warm air mode door 121 for opening and closing the warm air outflow port 112b and the warm air discharge port 119b.

The cold air mode door 120 and the warm air mode door 121 are all dome-shaped doors.

Therefore, in the cooling mode, when the cold air outflow port 111b and the warm air discharge port 119b are opened, the air flowing inside the cold air passageway 111 is changed into cold air while passing through the evaporator 104, and then, is discharged to the interior of the vehicle through the cold air outflow port 111b to carry out cooling. In this instance, the air flowing inside the warm air passageway 112 is changed into warm air while passing through the condenser 102, and then, is discharged to the exterior of the vehicle through the warm air discharge port 119b.

In the heating mode, when the warm air outflow port 112b and the cold air discharge port 119a are opened, the air flowing inside the warm air passageway 112 is changed into warm air while passing through the condenser 102, and then, is discharged to the interior of the vehicle through the warm air outflow port 112b to carry out heating. In this instance, the air flowing inside the cold air passageway 111 is changed into cold air while passing through the evaporator 104, and then, is discharged to the exterior of the vehicle through the cold air discharge port 119a.

In addition, a bypass passageway 114 is formed to penetrate the partition wall 113 between the evaporator 104 and the condenser 102 to communicate the cold air passageway 111 and the warm air passageway 112 with each other, and a bypass door 115 is mounted on the bypass passageway 114 to open and close the bypass passageway 114.

As shown in FIG. 7, in the structure that the evaporator 104 is arranged below the partition wall 113 and the condenser 102 is arranged above the partition wall 113, the bypass passageway 114 bypasses some of the cold air passing through the evaporator 104 inside the cold air passageway 111 toward the warm air passageway 112, and the bypass door 115 closes the bypass passageway 114 in the cooling mode but selectively opens and closes the bypass passageway 114 in the heating mode.

Therefore, in a state where the bypass door 115 closes the bypass passageway 114, in the cooling mode, the cold air cooled by the evaporator 104 while flowing inside the cold air passageway 111 is supplied to the interior of the vehicle to carry out cooling, and the air flowing inside the warm air passageway 112 is released out. In the heating mode, the warm air heated by the condenser 102 while flowing inside the warm air passageway 112 is supplied to the interior of the vehicle to carry out heating, and in this instance, the air flowing inside the cold air passageway 111 is released out.

Furthermore, when dehumidification is needed during the heating mode, namely, in a dehumidification mode, as shown in FIG. 7, the bypass door 115 opens the bypass passageway 114. In this instance, some of the air cooled and dehumidified by the evaporator 104 while flowing inside the cold air passageway 111 is bypassed toward the warm air passageway 112 through the bypass passageway 114 and passes through the condenser 102, and then, is supplied to the interior of the vehicle to carry out dehumidification and heating. The remaining air is released out.

Figure 6:
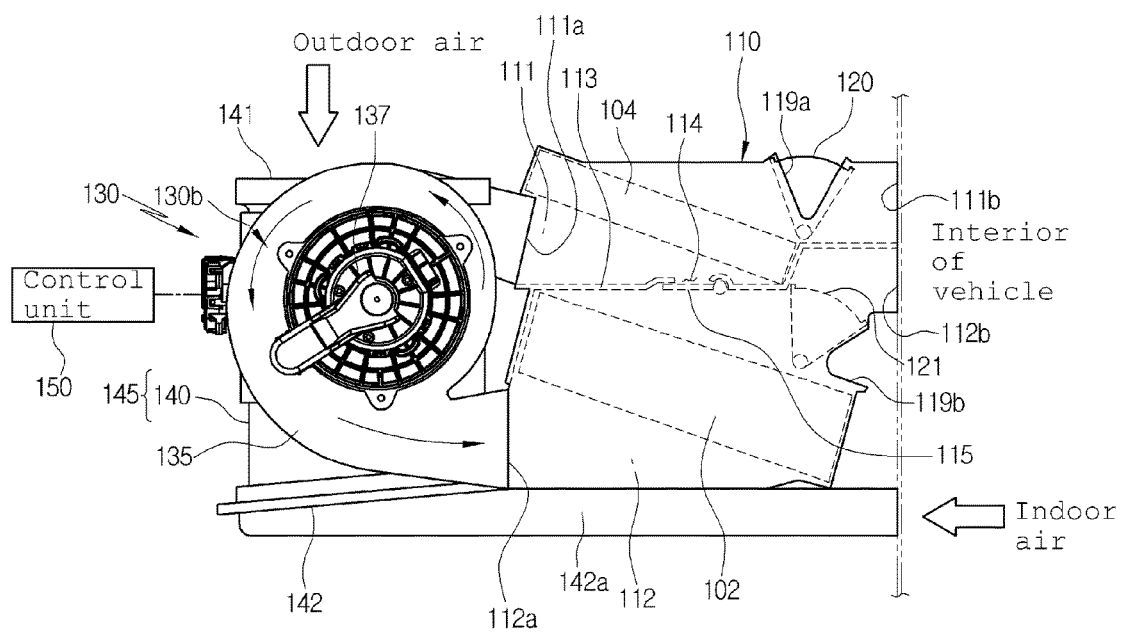
FIG. 6 is a side view seen from an "A" side of FIG. 4.

In the meantime, as shown in FIG. 6, in the structure that the evaporator 104 is arranged above the partition wall 113 and the condenser 102 is arranged below the partition wall 113, the bypass passageway 114 bypasses some of the warm air passing through the condenser 102 inside the warm air passageway 112 toward the cold air passageway 111, and the bypass door 115 closes the bypass passageway 114 in the cooling mode but selectively opens and closes the bypass passageway 114 in the heating mode.

In the structure illustrated in FIG. 6, when some of the warm air passing through the condenser 102 passes through the evaporator 104 after being bypassed to the cold air passageway 111 through the bypass passageway 114, it prevents frosting of the evaporator 104. Of course, as described later, indoor air which is dehumidified air of high temperature is supplied to the evaporator 104 to prevent frosting of the evaporator 104.

Moreover, an extractor 50 is mounted on the vehicle in order to discharge the indoor air of the vehicle to the exterior of the vehicle.

The extractor 50 is opened by differential pressure between the interior of the vehicle and the exterior of the vehicle and is mounted on a trunk of the vehicle. Meanwhile, because the extractor 50 is well-known, a detailed description of the extractor 50 will be omitted.

Therefore, when cold air or warm air is supplied to the interior of the vehicle through the air-conditioning case 110, the extractor 50 is opened by differential pressure between the interior of the vehicle and the exterior of the vehicle, and in this instance, a predetermined amount of indoor air of the vehicle is discharged out through the extractor 50.

Furthermore, in a specific mode, the indoor air (heating air) of the vehicle which is discharged to the exterior of the vehicle through the extractor 50 is recirculated to pass through the evaporator 104 and to be discharged to the exterior of the vehicle. In other words, a waste heat source which was thrown out to the exterior of the vehicle is recycled to be discharged out after exchanging heat with the evaporator 104 so that the air of high temperature dehumidified inside the interior of the vehicle is supplied to the evaporator 104 to prevent frosting of the evaporator 104 and enhance heating performance by rising refrigerant pressure and temperature in the refrigerant cycle without needing additional components.

Here, the specific mode means the heating mode that the warm air passing through the condenser 102 is supplied to the interior of the vehicle and the cold air passing through the evaporator 104 is discharged to the exterior of the vehicle or the dehumidification mode that the warm air passing through the condenser 102 is supplied to the interior of the vehicle and some of the cold air passing through the evaporator 104 is discharged to the exterior of the vehicle and some of the cold air flows to the warm air passageway 112 to be supplied to the interior of the vehicle after passing through the condenser 102.

Therefore, for the specific mode, a control unit 150 for controlling to inhale the indoor air of the vehicle through control of the indoor and outdoor air supplying means 145, to pass the inhaled indoor air through the evaporator 104 which is the heat exchanger for cooling and to discharge some of whole of the air to the exterior of the vehicle is disposed.

Figure 9:
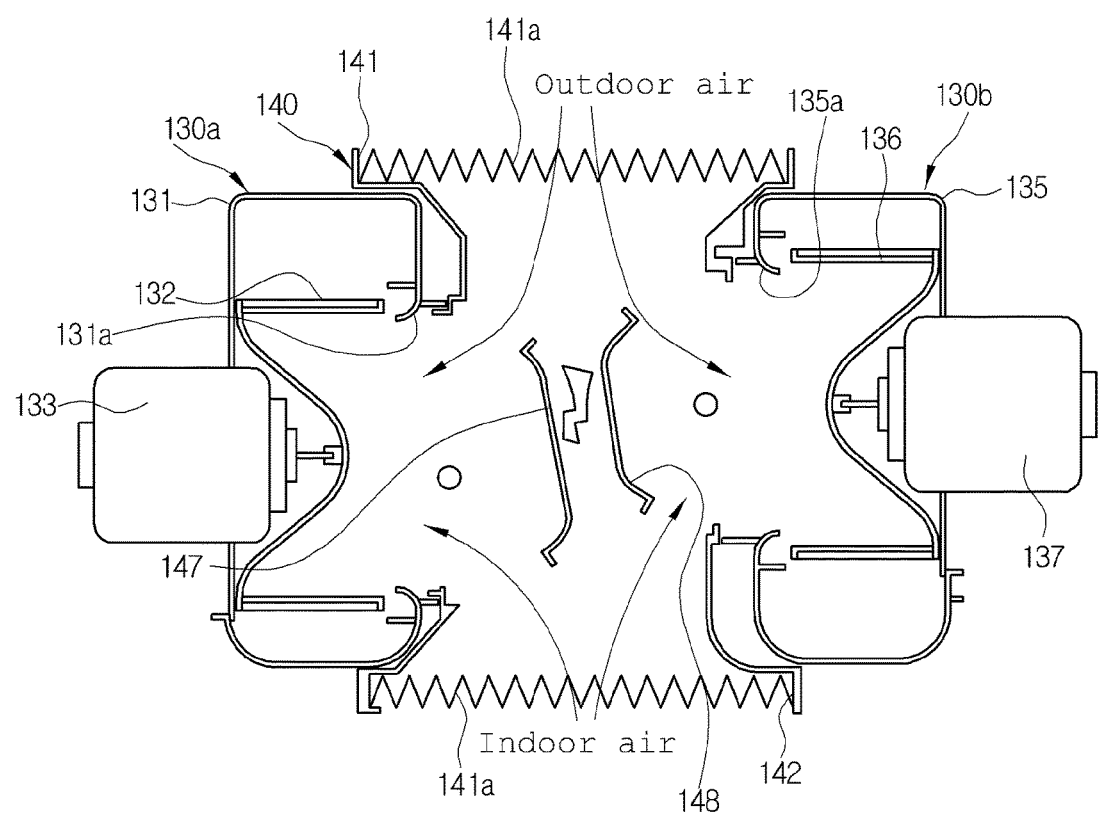
FIG. 9 is a sectional view of the air blower in the heating mode of the air conditioning system for the vehicle according to the present invention.

Of course, the control unit 150 can control to inhale only indoor air and supply the inhaled air to the evaporator 104 in the specific mode, but, as shown in FIG. 9, can control the indoor and outdoor air supplying means 145 to inhale indoor air of the vehicle and outdoor air of the vehicle and supply the mixed air of the indoor air and the outdoor air to the evaporator 104 and the condenser 102 in the specific mode.

In this instance, in the specific mode, the control unit 150 controls the first indoor and outdoor air converting door 147 to open all of the indoor air inlet 142 and the outdoor air inlet 141 relative to the first blower 130a and controls the second indoor and outdoor air converting door 148 to open all of the indoor air inlet 142 and the outdoor air inlet 141 relative to the second blower 130b.

That is, in the specific mode, the control unit 150 controls the first and second indoor and outdoor air converting doors 147 and 148 of the indoor and outdoor air supplying means 145 to recirculate a predetermined amount of the indoor air, which will be discharged from the interior to the exterior of the vehicle through the extractor 50, to the evaporator 104. Of course, the predetermined amount of the indoor air which will be discharged to the exterior of the vehicle may be recirculated only to the evaporator 104 or to the evaporator 104 and the condenser 102.

Figure 11:
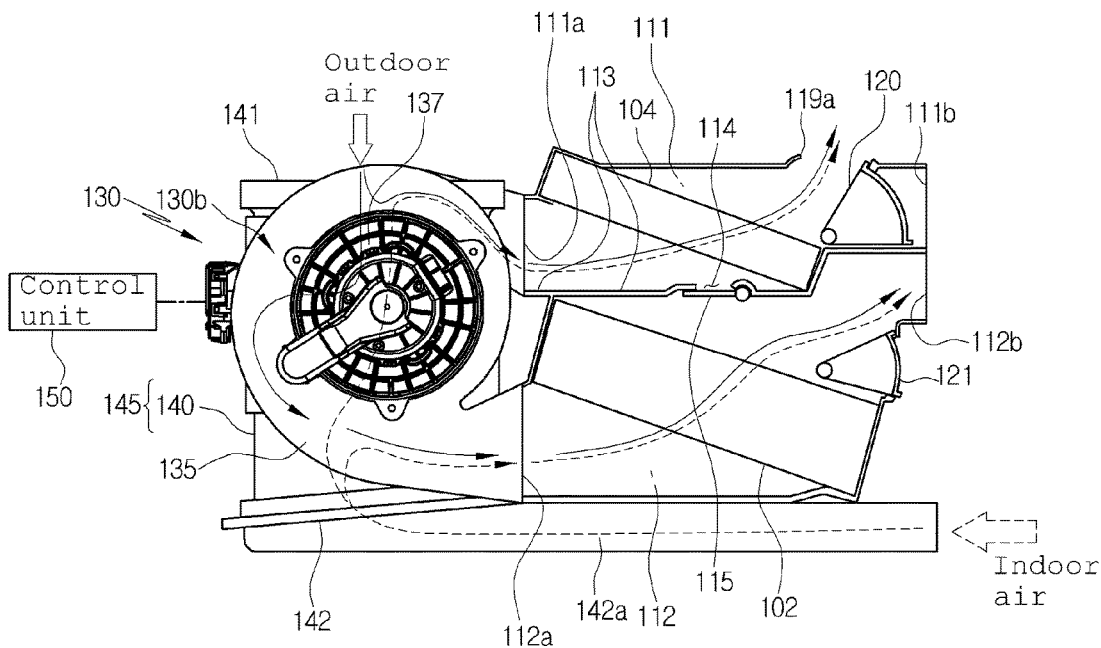
FIG. 11 is a view showing a heating mode of the air conditioning system for the vehicle according to the present invention.

In other words, after the indoor air which will be discharged to the extractor 50 is recirculated, some of the air is resupplied to the interior of the vehicle after passing through the condenser 102, but as shown in FIG. 11, some of the air is released to the engine room (exterior of the vehicle) after passing through the evaporator 104. Therefore, because the amount of indoor air to be discharged to the extractor 50 can be reduced or eliminated, the size of the extractor 50 can be reduced or substituted.

As described above, in the heating mode or the dehumidification mode which is the specific mode, pleasant indoor air of high-temperature and low-humidity which will be discharged to the exterior of the vehicle is recirculated and passes the evaporator 104, or indoor air of high-temperature and low-humidity and outdoor air of low-temperature and high-humidity are mixed together to become air of middle-temperature and low-humidity and the air of middle-temperature and low-humidity is discharged out after passing through the evaporator 104, so as to solve the problem of frosting formed on the evaporator 104.

Furthermore, in the dehumidification mode, as shown in FIG. 7, when the bypass door 115 located at the rear of the evaporator 104 is opened, some of the cold air dehumidified after passing through the evaporator 104 passes through the condenser 102 of the warm air passageway 112 to be reheated, and then, is supplied to the interior of the vehicle. The pleasant air supplied to the interior of the vehicle is recirculated to the indoor air inflow duct 142a, passes through the evaporator 104, and then, is discharged to the exterior of the vehicle so as to prevent frosting of the evaporator 104.

In the meantime, the control unit 150 in the specific mode, for instance, in the heating mode, controls the indoor and outdoor air supplying means 145 to supply a relatively large amount of outdoor air to the evaporator 104 and supply a relatively large amount of indoor air to the condenser 102.

In this instance, in the heating mode, it is preferable that the ratio of the indoor air to the outdoor air supplied to the first blower 130*a* located at the evaporator 104 is 30:70 and the ratio of indoor air to the outdoor air supplied to the second blower 130*b* located at the condenser 102 is 70:30.

In other words, in the heating mode, a relatively large amount of indoor air is supplied to the second blower 130*b* of the condenser 102 so as to enhance heating performance, and a relatively large amount of outdoor air is supplied to the first blower 130*a* of the evaporator 104 to enhance performance of the air conditioning system by securing the air volume.

Furthermore, in the cooling mode, 100 percent of the indoor air is supplied to the first blower 130*a* of the evaporator 104, and 100 percent of the outdoor air is supplied to the second blower 130*b* of the condenser 102.

Meanwhile, the control unit 150, in the specific mode, controls the cold air mode door 120 of the air conditioning system to discharge some or the whole of the mixed air of the indoor air and the outdoor air passing through the evaporator 104 to the exterior of the vehicle. In this instance, in the heating mode, the control unit 150 controls the cold air mode door 120 to control the amount of the mixed air discharged to the exterior of the vehicle.

Additionally, the control unit 150, in the maximum heating mode, controls the cold air mode door 120 of the air conditioning system to discharge the whole of the mixed air passing through the evaporator 104 to the exterior of the vehicle.

Hereinafter, a refrigerant flowing process of the air conditioning system for the vehicle according to the present invention will be described.

First, the gas-phase refrigerant of high-temperature and high-pressured discharged after being compressed in the compressor 101 is induced into the condenser 102.

The gas-phase refrigerant induced into the condenser 102 exchanges heat with the air passing through the condenser 102, and in the above process, the refrigerant is cooled and is liquefied while being cooled.

The liquid-phase refrigerant discharged from the condenser 102 is induced into the expansion means to be decompressed and expanded.

The refrigerant decompressed and expanded in the expansion means becomes an atomized state of low-temperature and low-pressure and is induced into the evaporator 104. The refrigerant induced into the evaporator 104 exchanges heat with the air passing through the evaporator 104 to be evaporated.

After that, the refrigerant of low-temperature and low-pressure discharged from the evaporator 104 is induced into the compressor 100, and then, recirculates the above-mentioned refrigeration cycle.

Hereinafter, air flow processes in the cooling mode, in the heating mode and in the dehumidification mode will be described.

A. Cooling Mode

Figure 10:
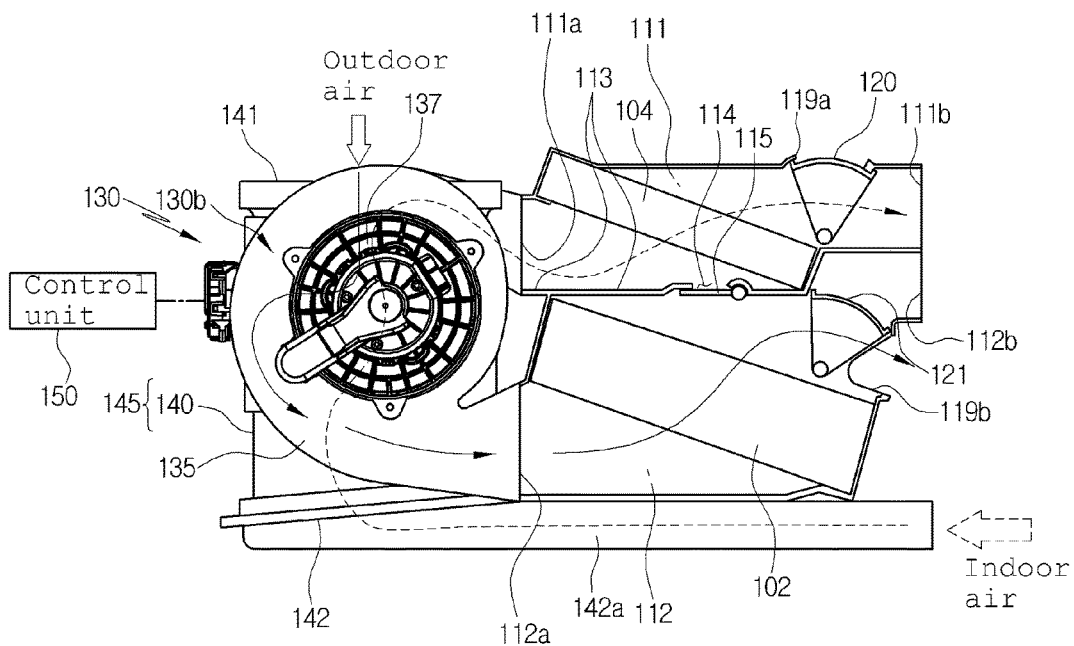
FIG. 10 is a view showing a cooling mode of the air conditioning system for the vehicle according to the present invention.

In the cooling mode, as shown in FIG. 10, the cold air mode door 120 opens the cold air outflow port 111*b*, and the warm air mode door 121 opens the warm air discharge port 119*b*.

Additionally, the control unit 150 controls the indoor and outdoor air supplying means 145 to supply indoor air to the first blower 130*a* and supply outdoor air to the second blower 130*b*.

Therefore, when the first and second blowers 130*a* and 130*b* are operated, the indoor air induced into the indoor air inlet 142 of the intake duct 140 is inhaled to the first blower 130*a* and is supplied to the cold air passageway 111, and the outdoor air induced into the outdoor air inlet 141 is inhaled to the second blower 130*b* and is supplied to the warm air passageway 112.

The indoor air supplied to the cold air passageway 111 is cooled while passing through the evaporator 104, and then, is discharged to the interior of the vehicle through the cold air outflow port 111*b* to carrying out cooling.

In this instance, the outdoor air supplied to the warm air passageway 112 is heated while passing through the condenser 102, and then, is discharged to the exterior of the vehicle through the warm air discharge port 119*b*.

B. Heating Mode

In the heating mode, as shown in FIG. 11, the warm air mode door 121 is operated to open the warm air outflow port 112*b*, and the cold air mode door 120 is operated to open the cold air discharge port 119*a*.

Furthermore, as shown in FIG. 9, the control unit 150 controls the indoor and outdoor air supplying means 145 to mix the indoor air and the outdoor air together and supply the mixed air to the first and second blowers 130*a* and 130*b*.

In this instance, a predetermined amount of the indoor air to be discharged to the exterior of the vehicle through the extractor 50 is recirculated toward the evaporator 104 through the indoor air inflow duct.

Therefore, when the first and second blowers 130*a* and 130*b* are operated, the indoor air and the outdoor air induced into the indoor and outdoor air inlets 141 and 142 of the intake duct 140 are mixed together and the mixed air is inhaled to the first and second blowers 130*a* and 130, and then, is supplied to the cold air passageway 111 and the warm air passageway 112.

The indoor and outdoor air supplied to the warm air passageway 112 is heated while passing through the condenser 102, and then, is discharged to the interior of the vehicle through the warm air outflow port 112*b* to carry out heating.

The indoor and outdoor air supplied to the cold air passageway 111 is cooled while passing through the evaporator 104, and then, is discharged to the exterior of the vehicle through the cold air discharge port 119*a*.

In this instance, pleasant air of high-temperature and low-humidity (heated air) of the interior of the vehicle exchanges heat while passing through the evaporator 104 so as to prevent frosting of the evaporator and enhance heating performance by rising refrigerant pressure and temperature in the refrigerant cycle.

C. Dehumidification Mode

In the dehumidification mode, referring to FIG. 7, the warm air mode door 121 is operated to open the warm air outflow port 112*b* and the cold air mode door 120 is operated to open the cold air discharge port 119*a*.

Moreover, as shown in FIG. 9, the control unit 150 controls the indoor and outdoor air supplying means 145 to mix the indoor air and the outdoor air together and supply the mixed air to the first and second blowers 130*a* and 130*b*.

In this instance, a predetermined amount of the indoor air to be discharge to the exterior of the vehicle through the extractor 50 is recirculated to the evaporator 104 through the indoor air inflow duct.

Furthermore, the bypass door 115 opens the bypass passageway 114.

Therefore, when the first and second blowers 130*a* and 130*b* are operated, the indoor air and the outdoor air induced into the indoor and outdoor air inlets 141 and 142 of the intake duct 140 are mixed together and the mixed air is inhaled to the first and second blowers 130a and 130, and then, is supplied to the cold air passageway 111 and the warm air passageway 112.

The indoor and outdoor air supplied to the warm air passageway 112 is heated while passing through the condenser 102, and then, is discharged to the interior of the vehicle through the warm air outflow port 112b to carry out heating.

The indoor and outdoor air supplied to the cold air passageway 111 is cooled and dehumidified while passing through the evaporator 104, and then, some of the cooled and dehumidified air is discharged to the exterior of the vehicle through the cold air discharge port 119a, and some of the cooled and dehumidified air flows toward the warm air passageway 112 through the bypass passageway 114, is heated while passing through the condenser 102, and then, is discharged to the interior of the vehicle to dehumidify and heat the interior of the vehicle.

In this instance, pleasant air of high-temperature and low-humidity (heated air) of the interior of the vehicle exchanges heat while passing through the evaporator 104 so as to prevent frosting of the evaporator and enhance heating performance by rising refrigerant pressure and temperature in the refrigerant cycle.

What is claimed is:

1. An air conditioning system for a vehicle comprising:
an air-conditioning case having a cold air passageway extending in an air flow direction and having a heat exchanger for cooling and a warm air passageway extending in the air flow direction and having a heat exchanger for heating;
an air blower which is mounted at an inlet of the air-conditioning case to blow air to the cold air passageway and the warm air passageway;
an indoor and outdoor air supplying means which is connected to the air blower to supply indoor air and outdoor air; and
a controller configured to control the indoor and outdoor air supplying means to inhale the indoor air of the vehicle, to pass the indoor air through the heat exchanger for cooling, and to discharge some or the whole of the indoor air to the exterior of the vehicle and configured to control the indoor and outdoor air supplying means to inhale the indoor air and the outdoor air of the vehicle and supply mixed air of the indoor air and the outdoor air to the heat exchanger for cooling and to the heat exchanger for heating;
wherein the air blower comprises a first blower for blowing air to the cold air passageway and a second blower for blowing air to the warm air passageway;
wherein the first blower includes a scroll case which is connected to the inlet of the cold air passageway of the air-conditioning case, a blast fan rotatably mounted inside the scroll case, an inlet ring which is formed on one side of the scroll case to induce indoor air and outdoor air, and a motor which is mounted on the other side of the scroll case to rotate the blast fan;
wherein the second blower includes a scroll case which is connected to the inlet of the warm air passageway of the air-conditioning case, a blast fan rotatably mounted inside the scroll case, an inlet ring which is formed on one side of the scroll case to induce indoor air and outdoor air, and a motor which is mounted on the other side of the scroll case to rotate the blast fan;
wherein the indoor and outdoor air supplying means comprises:
an intake duct which is communicatingly connected with the first and second blowers and has an indoor air inlet and an outdoor air inlet;
a first indoor and outdoor air converting door which selectively opens the outdoor air inlet and the indoor air inlet relative to the first blower;
a second indoor and outdoor air converting door which selectively opens the outdoor air inlet and the indoor air inlet relative to the second blower;
wherein the first blower and the second blower are spaced from one another in a horizontal direction;
wherein the intake duct is mounted between the first blower and the second blower in the horizontal direction and extends continuously in a vertical direction being perpendicular to the horizontal direction between an upper part defining the outdoor air inlet and a lower part defining the indoor air inlet;
wherein the first and second indoor and outdoor air converting doors are positioned in the intake duct between the outdoor air inlet and the indoor air inlet in the vertical direction, and between the first and second blowers in the horizontal direction.

2. The air conditioning system according to claim 1, wherein the controller is further configured to control the indoor and outdoor air supplying means in a heating mode wherein the warm air passing through the heat exchanger for heating is supplied to the interior of the vehicle and, wherein the cold air passing through the heat exchanger for cooling is discharged to the exterior of the vehicle.

3. The air conditioning system according to claim 1, wherein the controller is further configured to control the indoor and outdoor air supplying means in a dehumidification mode wherein the warm air passing through the heat exchanger for heating is supplied to the interior of the vehicle and some of the cold air passing through the heat exchanger for cooling is discharged to the exterior of the vehicle and to supply some of the cold air flow to the warm air passageway to the interior of the vehicle after passing through the heat exchanger for heating.

4. The air conditioning system according to claim 1, wherein the controller is configured to open the first indoor and outdoor air converting door to open the indoor air inlet and the outdoor air inlet relative to the first blower and the controller is configured to open the second indoor and outdoor air converting door to open the indoor air inlet and the outdoor air inlet relative to the second blower.

5. The air conditioning system according to claim 1, wherein the controller is further configured to control the indoor and outdoor air supplying means to recirculate a predetermined amount of the indoor air, which will be discharged from the interior to the exterior of the vehicle, to the heat exchanger for cooling.

6. The air conditioning system according to claim 1, wherein an extractor is mounted on the vehicle in order to discharge the indoor air of the vehicle to the exterior of the vehicle, and
wherein the controller is further configured to control the indoor and outdoor air supplying means to recirculate a predetermined amount of the indoor air, which will be discharged to the extractor, to the heat exchanger for heating and the heat exchanger for cooling.

7. The air conditioning system according to claim 1, wherein the controller is configured to control the indoor and outdoor air supplying means to supply more outdoor air than the indoor air to the heat exchanger for cooling and supply more indoor air than the outdoor air to the heat exchanger for heating.

8. The air conditioning system according to claim 1, wherein the controller is configured to control the indoor and outdoor air supplying means to discharge some or the whole of the mixed air of the indoor air and the outdoor air passing through the heat exchanger for cooling to the exterior of the vehicle.

9. The air conditioning system according to claim 1, wherein the cold air passageway and the warm air passageway are formed to be partitioned from each other in a vertical direction inside the air-conditioning case,
wherein a cold air outflow port for discharging the cold air passing through the heat exchanger for cooling to the interior of the vehicle and a cold air discharge port for discharging the cold air to the exterior of the vehicle are mounted at an outlet of the cold air passageway of the air-conditioning case, and
wherein a warm air outflow port for discharging the warm air passing through the heat exchanger for heating to the interior of the vehicle and a warm air discharge port for discharging the warm air to the exterior of the vehicle are mounted at an outlet of the warm air passageway of the air-conditioning case.

10. The air conditioning system according to claim 1, wherein the heat exchanger for cooling and the heat exchanger for heating are connected with a compressor and expansion means through a refrigerant circulation line.

11. The air conditioning system according to claim 10, wherein the heat exchanger for cooling is an evaporator, and the heat exchanger for heating is a condenser.

12. The air conditioning system according to claim 1 wherein a partition wall is positioned between the cold air passage way and the warm air passageway, wherein a bypass passageway is formed between the cold air passageway and the warm air passageway, and wherein a bypass door is positioned in the bypass passage for opening and closing the bypass passageway.

13. The air conditioning system according to claim 12 wherein the heat exchanger for cooling is disposed below the partition wall in the cold air passageway and the heat exchanger for heating is disposed above the partition wall in the warm air passageway such that the bypass door opens the cold air passageway to the warm air passageway and part of the air cooled and dehumidified by the heat exchanger for cooling passes through the bypass passageway to the warm air passageway, and then passes through the heat exchanger for heating to perform dehumidification heating in a dehumidification mode.

14. The air conditioning system according to claim 12 wherein the heat exchanger for cooling is disposed below the partition wall in the cold air passageway and the heat exchanger for heating is disposed above the partition wall in the warm air passageway, such that warm air that has passed through the heat exchanger for heating may pass to the cold air passageway through the bypass passageway and then through the heat exchanger for cooling so that the heat exchanger for cooling is prevented from being frosted in a cooling mode.

15. The air conditioning system according to claim 1 wherein the heat exchanger for cooling and the heat exchanger for heating are oriented at a non-perpendicular angle relative to the air flow direction.

16. An air conditioning system for a vehicle comprising:
an air-conditioning case having a cold air passageway extending in an air flow direction and having a heat exchanger for cooling, and a warm air passageway extending in the air flow direction and having a heat exchanger for heating;
wherein the warm air passageway defines a warm air outflow port to an interior of the vehicle and a warm air discharge port to an exterior of the vehicle, wherein the cold air passageway defines a cold air outflow port to an interior of the vehicle and a cold air discharge port to an exterior of the vehicle, wherein a warm air mode door is configured to open and close the warm air outflow port and warm air discharge port, and wherein a cold air mode door is configured to open and close the cold air outflow port and cold air discharge port;
an air blower which is mounted at an inlet of the air-conditioning case to blow air through the cold air passageway and the warm air passageway;
an indoor and outdoor air supplying means which is connected to the air blower to supply indoor air and outdoor air;
wherein the air blower comprises a first blower for blowing air to the cold air passageway and a second blower for blowing air to the warm air passageway;
wherein the first blower includes a scroll case which is connected to the inlet of the cold air passageway of the air-conditioning case, a blast fan rotatably mounted inside the scroll case, an inlet ring which is formed on one side of the scroll case to induce indoor air and outdoor air, and a motor which is mounted on the other side of the scroll case to rotate the blast fan;
wherein the indoor and outdoor air supplying means comprises:
an intake duct which is communicatingly connected with the first and second blowers and has an indoor air inlet and an outdoor air inlet;
a first indoor and outdoor air converting door which selectively opens the outdoor air inlet and the indoor air inlet relative to the first blower;
a second indoor and outdoor air converting door which selectively opens the outdoor air inlet and the indoor air inlet relative to the second blower;
wherein the first blower and the second blower are spaced from one another in a horizontal direction;
wherein the intake duct is mounted between the first blower and the second blower in the horizontal direction and extends continuously in a vertical direction being perpendicular to the horizontal direction between an upper part defining the outdoor air inlet and a lower part defining the indoor air inlet;
wherein the first and second indoor and outdoor air converting doors are positioned in the intake duct between the outdoor air inlet and the indoor air inlet in the vertical direction, and between the first and second blowers in the horizontal direction;
a controller configured to control the indoor and outdoor air supplying means and the first and second indoor and outdoor air converting door, wherein in a heating mode and in a dehumidification mode, the controller is configured to move the warm air mode door to open the warm air outflow port to the interior of the vehicle and to close the warm air discharge port to the exterior, to move the cold air mode door to close the cold air outflow port to the interior and to open the cold air discharge port to the exterior, to move the first indoor and outdoor air converting door to open the indoor air inlet relative to the first blower in order to allow heated air from the interior of the vehicle to exchange heat while passing over the evaporator so as to prevent frosting of the evaporator and enhance heating performance by increasing refrigerant pressure and temperature.

17. The air conditioning system according to claim 16 wherein the controller and the motors that rotate the blast fans of the first and second blowers are installed outside of the air-conditioning case.

* * * * *